United States Patent [19]

Prasad et al.

[11] Patent Number: 5,733,435
[45] Date of Patent: Mar. 31, 1998

[54] PRESSURE DRIVEN SOLID ELECTROLYTE MEMBRANE GAS SEPARATION METHOD

[75] Inventors: Ravi Prasad, East Amherst; Christian Friedrich Gottzmann, Clarence, both of N.Y.

[73] Assignee: Praxair Technology, Inc., Danbury, Conn.

[21] Appl. No.: 811,671

[22] Filed: Mar. 5, 1997

Related U.S. Application Data

[63] Continuation of Ser. No. 444,354, May 18, 1995, abandoned.

[51] Int. Cl.[6] ............................................. B01D 53/00
[52] U.S. Cl. ........................... 205/765; 95/45; 95/54; 96/4; 204/421; 205/770
[58] Field of Search ....................... 204/421–429; 205/763, 765, 770; 95/45, 54; 96/4

[56] References Cited

U.S. PATENT DOCUMENTS

| | | | |
|---|---|---|---|
| 3,400,054 | 9/1968 | Ruka et al. | 204/427 |
| 5,035,726 | 7/1991 | Chen et al. | 55/16 |
| 5,035,727 | 7/1991 | Chen | 55/16 |
| 5,108,465 | 4/1992 | Bauer et al. | 55/16 |
| 5,160,713 | 11/1992 | Mazanec et al. | 423/210 |
| 5,205,842 | 4/1993 | Prasad | 55/16 |
| 5,306,411 | 4/1994 | Mazanec et al. | 204/265 |
| 5,378,263 | 1/1995 | Prasad | 95/54 |
| 5,447,555 | 9/1995 | Yee et al. | 95/54 |
| 5,454,923 | 10/1995 | Nachlas et al. | 204/270 |

OTHER PUBLICATIONS

Robert A. Huggins, "Ionically Conducting Solid-State Membranes", Advances in Electrochemistry & Electrochem., Series 10, pp. 323–389 (1977) month unavailable.

H. Iwahara et al., "Mixed Conduction & Oxygen Permeation in Sintered Oxides of a System ZrO2–Tb4O7", Advances in Ceramics, pp. 907–914 (1988) month unavailable.

Y. Teraoka et al., "Oxygen Permeation through Perovskite-type Oxides", Chemistry Letters, pp. 1743–1746 (1985) month unavailable.

T. M. Gur, et al., "A New Class of Oxygen Selective Chemically Driven Nonporous Ceramic Membranes" Part I, Journal of Membrane Science, pp. 151–161 (1992) month unavailable.

Primary Examiner—T. Tung
Attorney, Agent, or Firm—Douglas E. Denninger

[57] ABSTRACT

A process for removing oxygen from a feed stream to obtain an oxygen-depleted product stream by applying the feed stream to at least one separator including a feed zone and a permeate zone separated by a solid electrolyte mixed conductor membrane, and driving a first portion of entrained oxygen in the feed stream from the feed zone to the permeate zone via the mixed conductor membrane by applying at least one of a purge stream and a negative pressure to the permeate zone to establish a lower partial pressure of oxygen in that zone. Oxygen-depleted retentate is withdrawn as a product stream. Preferably, at least one additional solid electrolyte ionic or mixed conductor membrane is also employed in feed series with the mixed conductor membrane.

9 Claims, 6 Drawing Sheets

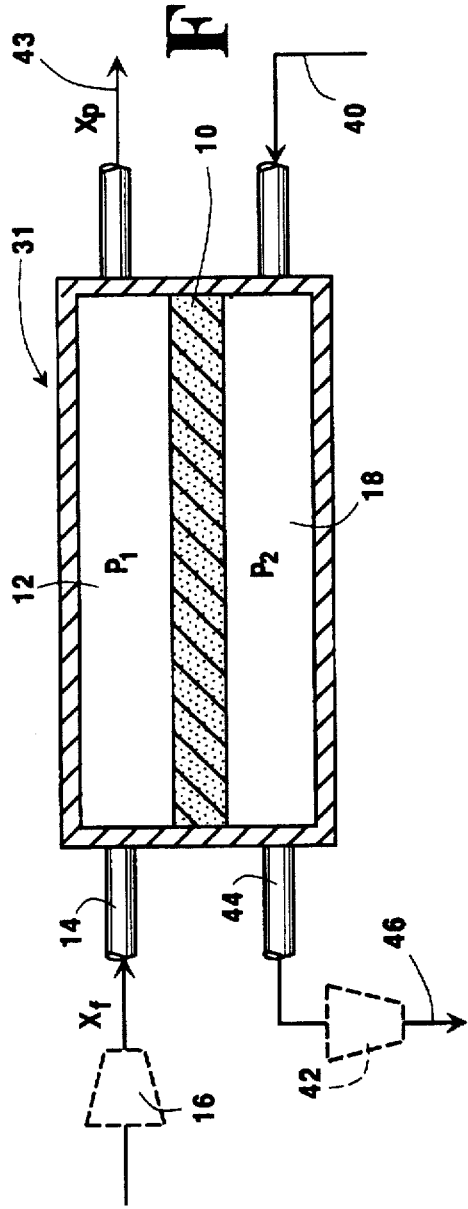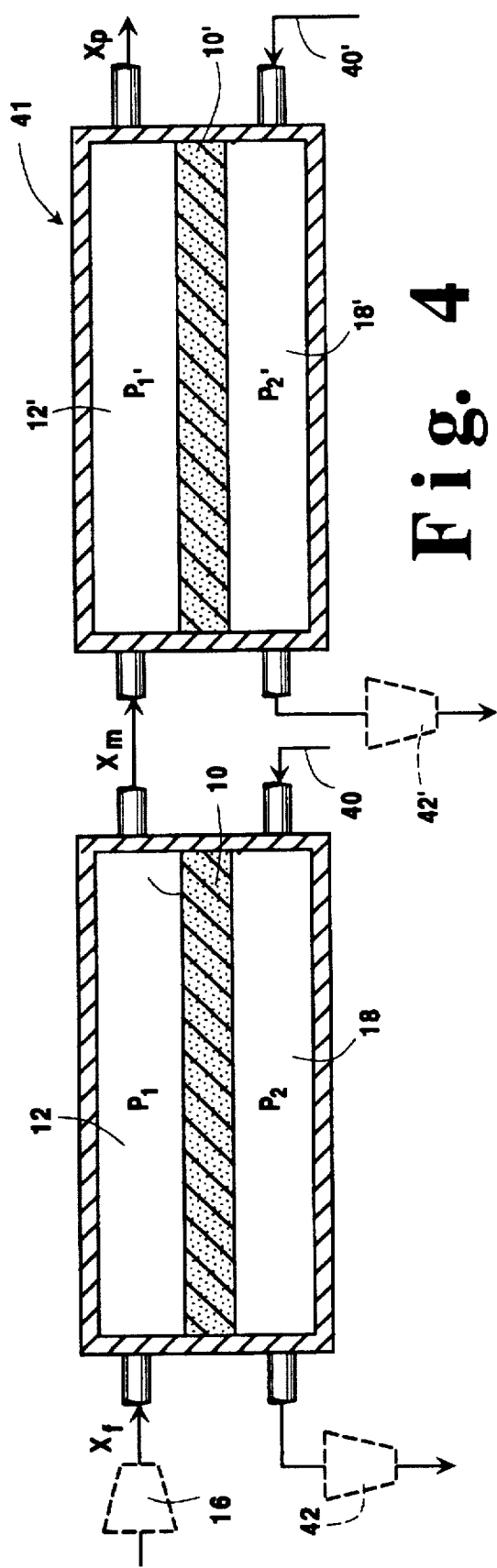

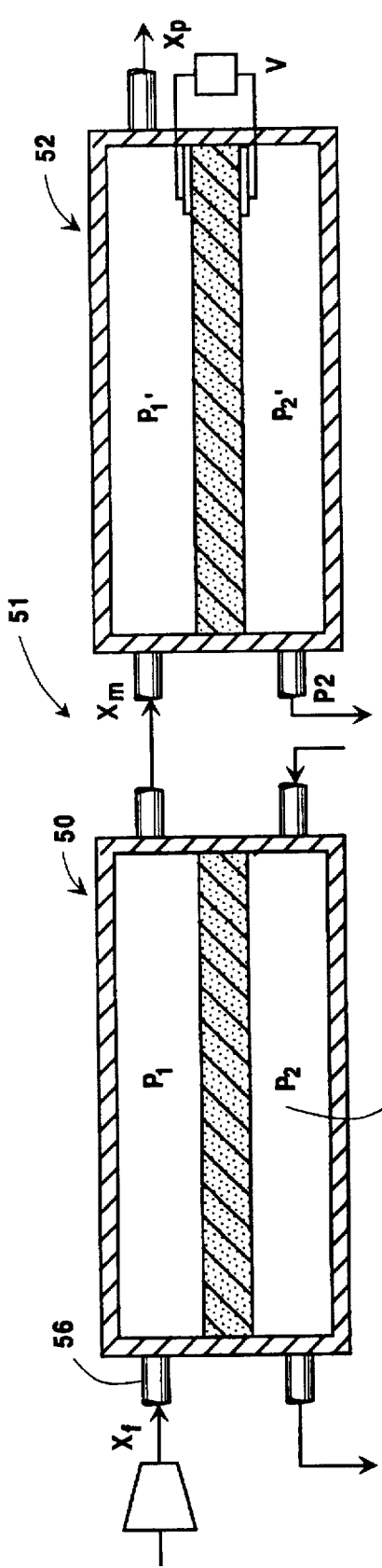
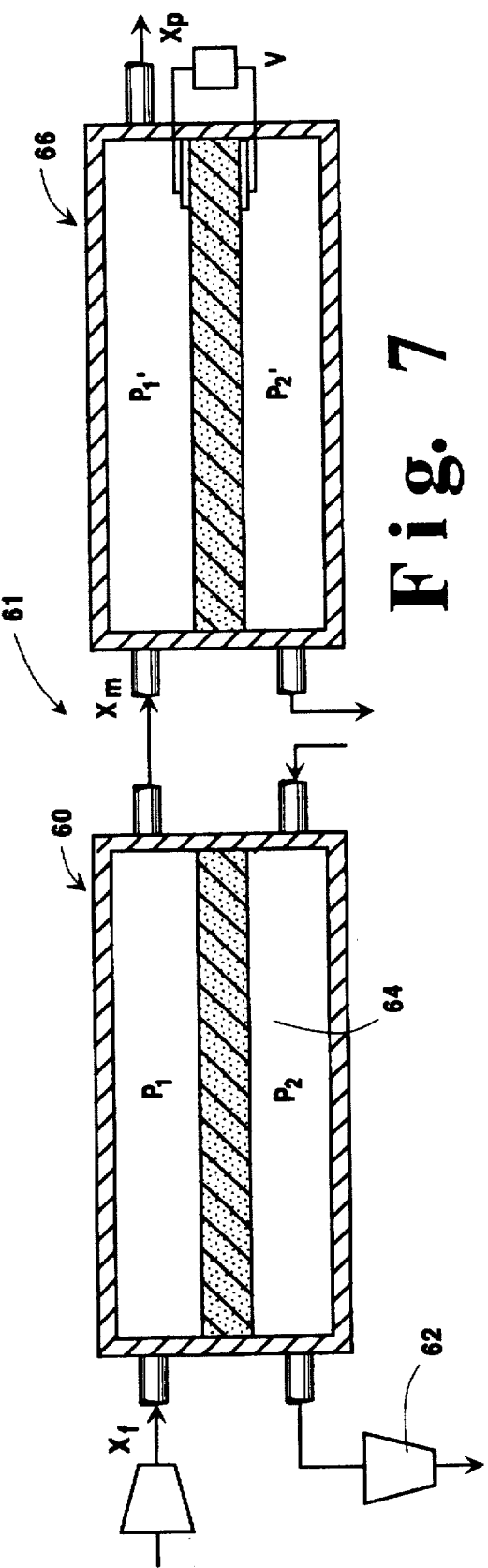

PRESSURE DRIVEN SOLID ELECTROLYTE MEMBRANE GAS SEPARATION METHOD

This application is a continuation of prior U.S. application Ser. No. 08/444,354 filed May 18, 1995 now abandoned.

FIELD OF THE INVENTION

This invention relates to procedures for separating oxygen from a mixed gas feed stream and, more particularly, to a method for employing a solid electrolyte membrane for removing oxygen to purify the feed stream.

BACKGROUND OF THE INVENTION

The use of certain membranes for the separation of air and other gas mixtures is an established technology. For instance, organic polymer membranes including composite hollow fibers have demonstrated separation preferences that favor the permeation of oxygen over nitrogen by a factor of ten or less. Processes employing such membranes have been devised for the production of oxygen and particularly nitrogen, from ambient air.

An entirely different type of membrane is made from inorganic oxides, typified by calcium or yttrium-stabilized zirconium and analogous oxides having a fluorite structure. At elevated temperatures, these materials contain mobile oxygen-ion vacancies. When an electric field is applied across such an oxide membrane, the membrane will transport oxygen and only oxygen and thus act as a membrane with an infinite selectivity for oxygen. Such membranes are attractive for use in air separation processes. More recently, materials have been reported that exhibit both ionic and electronic conductivity. A membrane exhibiting such a mixed conduction characteristic can, however, transport oxygen when subjected to a differential partial pressure of oxygen, without the need for an applied electric field.

Gur et al. describe transport properties of inorganic, nonporous membranes based on mixed-conducting perovskites. High transport rates are reported, indicating opportunity for chemically driven membrane applications for selective separation or purification of oxygen. See "A New Class Of Oxygen Selective Chemically Driven NonPorous Ceramic Substrates", Part I, A-Site Doped Perovskites, Journal of Membrane Science, 75:151–162 (1992). Teraoka et al., in Chemistry Letters, pages 1743–1746 (1985) indicate that the rate of oxygen permeation through perovskite-type oxides increases with an increase in strontium or cobalt content. Iwahara et al. indicate the presence of mixed conduction in sintered oxides of zirconium-containing ceramic materials that have been doped with terbium. Electrochemical oxygen permeation is indicated as occurring in such materials. See Iwahara et al. "Mixed Conduction and Oxygen Permeation in Sintered Oxides of a System $ZrO_2$—$Tb_4O_7$", Advances in Ceramics, Vol. 24, Science and Technology of Zirconia III pages 907–915 (1988). An overall review of ionically-conducting solid state membranes can be found in an article by Huggins entitled "Ionically Conducting Solid State Membranes" appearing in Advances in Electrochemistry and Electrochemical Engineering, Series 10, pages 323–389 (1977).

In a mixed conduction inorganic oxide, oxygen transport occurs due to a presence of oxygen vacancies in the oxide. Oxygen ions annihilate oxygen-ion vacancies which are highly mobile in the oxide. Electrons must be supplied (and removed at the other side of an oxide membrane) to make the reaction proceed. For materials that exhibit only ionic conductivity, electrodes must be applied to opposed surfaces of the oxide membrane and the electronic current is carried by an external circuit.

For mixed conductor materials that exhibit both ionic and electronic conductivity, the countercurrent to the flow of oxygen vacancies is carried by an internal flow of electrons, rather than by a current through an external circuit. The entire transport is driven by partial pressures in the streams adjacent either side of a mixed conduction inorganic oxide membrane. While such a membrane is attractive for the removal of larger quantities of oxygen from inert gas streams, the process is limited by pressures that can be applied. Since the "permeate" stream that carries the oxygen away from the membrane is "pure" oxygen, both the feed and the product streams must be at a high pressure (or the "permeate" stream at a very low pressure) to create a driving force for the oxygen transport. Even then, the degree of purification that can be obtained is limited.

In the patent art, there are a number of teachings regarding the use of mixed conduction inorganic oxide membranes. Bauer et al. in U.S. Pat. No. 5,108,465 describes a cell for removing oxygen from a nitrogen stream that employs a mixed conduction membrane. The Bauer et al. cell operates based upon the principle of different oxygen partial pressures on either side of the membrane. The sole operating force for the "oxygen pump" disclosed by Bauer is the oxygen partial pressure difference obtained by pressurizing the nitrogen/oxygen gas mixture and/or by reducing the pressure in the pure oxygen gas compartment.

Chen et al. in U.S. Pat. Nos. 5,035,726 and 5,035,727 describe the use of solid electrolyte membrane systems for the recovery of oxygen. In the '726 patent, Chen et al. employ an electrically-driven ionic conductor to achieve gas separation. Chen et al. also mention the possibility of using mixed conductor membranes operated by maintaining an oxygen pressure on the feed side. In the '727 patent, Chen describes the use of an electrically driven gas separation system wherein oxygen is extracted from a feed stream emanating from a compressor of a gas turbine system. Chen et al. further teach that oxygen exiting from the permeate side of an electrically-driven ionic membrane may either be removed as a pure oxygen stream or mixed with a suitable "sweep" gas such as nitrogen.

Mazanec et al. in U.S. Pat. No. 5,160,713 describe oxygen separation processes employing a bismuth-containing mixed metal oxide membrane. Mazonec et al. state generally that the separated oxygen can be collected for recovery or reacted with an oxygen-consuming substance. The oxygen-depleted retentate apparently is discarded.

The above-identified patent and technical literature do not disclose means for reducing either pressure or compressor power to levels required for practical application of mixed conduction membranes to the separation and purification of gases by controlled permeation of oxygen. Pure pressure driven systems require relatively high compressor powers and pure electrically-driven systems expend very high levels of electrical power to achieve the oxygen separation.

OBJECTS OF THE INVENTION

It is therefore an object of this invention to provide an improved oxygen separation system employing at least one solid electrolyte mixed conduction oxide membrane.

It is another object of this invention to provide an improved oxygen separation system employing a mixed conductor oxide membrane and at least one solid electrolyte ionic conductor membrane wherein power requirements are reduced from those exhibited by the prior art.

It is yet another object of this invention to provide an improved oxygen separation system employing mixed conduction oxide membranes wherein multiple stages are employed to enable reduced power consumption.

A still further object of the invention is to provide such a multiple stage system which can utilize different materials or types of solid electrolyte membranes in each stage.

Yet another object of the invention is to provide an improved oxygen separation system which can utilize a portion of retentate to enhance oxygen transport through a solid electrolyte membrane.

SUMMARY OF THE INVENTION

This invention comprises a process for removing oxygen from a feed stream to obtain an oxygen-depleted product stream by applying the feed stream to at least one separator including a feed zone and a permeate zone separated by a solid electrolyte mixed conduction oxide membrane, driving a first portion of entrained oxygen in the feed stream from the feed zone to the permeate zone via the membrane by applying at least one of a purge stream and negative pressure to the permeate zone to remove oxygen therefrom by establishing a lower partial pressure of oxygen in the permeate zone, and withdrawing oxygen-depleted retentate as a product stream after entrained oxygen has been removed from the feed zone. Preferably, the process further includes directing a feed stream output from the feed zone of the first separator to a second feed zone of a second separator, the second separator provided with a second permeate zone separated from the second feed zone by a second solid electrolyte ionic or mixed conduction oxide membrane.

DESCRIPTION OF THE DRAWINGS

Other objects, features and advantages will occur to those skilled in the art from the following description of preferred embodiments and the accompanying drawings, in which:

FIG. 3 is a schematic showing of a novel single stage, pressure-driven oxygen separation process which employs both a vacuum pump and a purge stream to enable a more substantial oxygen gradient across a mixed conduction oxide membrane;

FIG. 4 is a schematic showing of a dual stage, pressure-driven oxygen separation process configured in accordance with the invention;

FIG. 6 is a schematic showing of a dual stage, combined, pressure-driven and electrically-driven oxygen separation process employing a first stage purge stream;

FIG. 7 is a schematic showing of a dual stage, combined, pressure-driven and electrically-driven oxygen separation process employing a first stage vacuum purge;

DETAILED DESCRIPTION OF THE INVENTION

Figure 1:
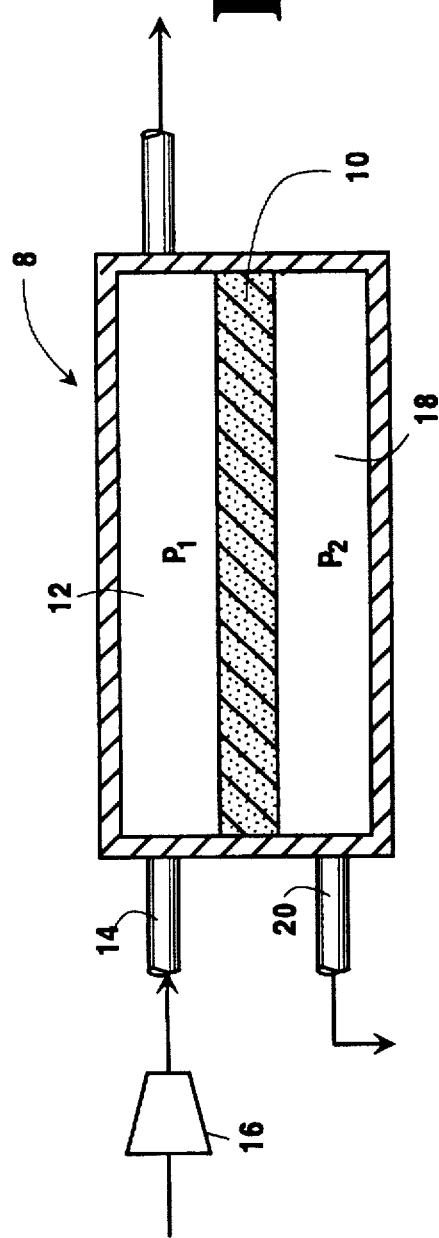
FIG. 1 is a schematic showing of a prior art, single stage, pressure-driven oxygen separation process.

A prior art pressure-driven oxygen separation apparatus 8, FIG. 1, employs a solid electrolyte mixed conduction oxide membrane 10. A feed chamber 12 receives a gas flow (via inlet conduit 14) that has been compressed by compressor 16. A permeate chamber 18 receives oxygen passing through membrane 10 and outputs the oxygen via conduit 20. The partial pressure $P_1$ of oxygen in feed chamber 12 must be maintained at a high level to overcome the partial pressure $P_2$ of the pure oxygen in permeate chamber 18. As a result, high power levels are required to achieve a sufficient oxygen partial pressure in feed chamber 12—rendering the system inefficient for high volume oxygen separation.

All oxygen separation procedures employing solid electrolyte membranes require that the inlet oxygen (and the temperature of the membrane) be at an elevated level, e.g. 400° C. to 1200° C., preferably 500° C. to 900° C.

Figure 2:
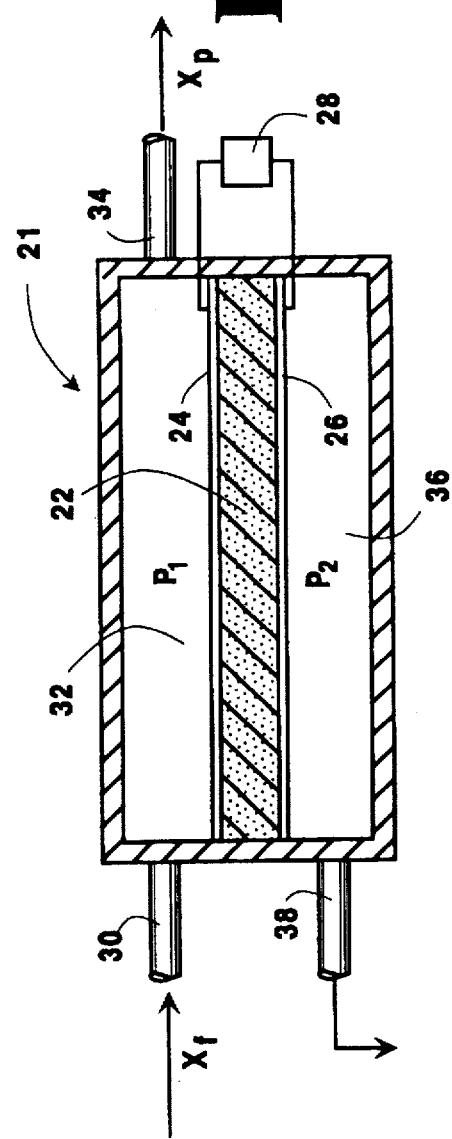
FIG. 2 is a schematic showing of a prior art, single stage, electrically-driven oxygen separation process.

A prior art system 21, FIG. 2, utilizes an electrically-driven ionic oxide membrane 22 which acts as a solid electrolyte when a voltage from power supply 28 is applied thereacross by cathode 24 and anode 26. A feed gas input conduit 30 feeds a gas having entrained oxygen at a feed mole percent concentration Xf. The feed gas passes into feed chamber 32 and out via conduit 34 containing a product oxygen mole percent concentration Xp. The electric potential applied by power supply 28 across membrane 22 creates the driving force to transport oxygen ions through membrane 22 and into permeate chamber 36. Output from permeate chamber 36 is taken via conduit 38. For any but small levels of Xf, the power required to achieve oxygen separation from the feed gas is extremely high and effectively renders the system impractical for removal of high concentrations of oxygen from the feed gas.

A novel system 31, FIG. 3, is similar to that of FIG. 1, with like elements numbered identically. In this instance, however, a purge gas having a low oxygen concentration is applied via conduit 40 to permeate chamber 18 and the compressor 16 is optional, as shown in phantom. Also optional is a vacuum pump 42 connected to output conduit 44 which draws a combined purge gas and permeate gas flow via conduit 44 as a waste stream that is discharged through conduit 46. As described in more detail below regarding Table 1 and FIG. 9, a portion of the retentate stream 43 is utilized as the purge gas in one embodiment. The introduction of purge gas into permeate chamber 18, when combined with the decreased pressure therein that results from the operation of vacuum pump 42, assures a large partial pressure ratio across membrane 10. As a result, a more efficient separation of oxygen occurs.

A pressure-driven two stage apparatus 41, FIG. 4, carries out oxygen separation from a feed stream with increased efficiency. Each separation stage is identical to that shown in FIG. 3, but the negative pressure levels applied by optional vacuum pumps 42 and 42', FIG. 4, are adjusted in one embodiment to different levels due to different partial pressures $P_1$ and $P_1'$ of oxygen in feed chambers 12 and 12', respectively. The negative pressure levels are adjusted in another embodiment to accommodate different oxygen partial pressures in the purge gases provided through conduit 40 and 40'. Note that the numbering of the second separation stage is identical to that of the first stage except that all of the numbers therein have primes appended thereto.

Both of the separation stages of FIG. 4 employ a pressure-driven process for the removal of oxygen from a feed stream, the process being enhanced in one embodiment by vacuum pumping of the permeate side of mixed conduction oxide membranes 10 and 10'. Further, purge streams are applied to both stages to further aid in control of the oxygen partial pressure in permeate chambers 18 and 18'. Anode-side purging and vacuum pumping greatly reduce oxygen partial pressures and thus make it possible to achieve a low value for the product oxygen mole fraction with economically attainable low pressure values of the feed stream.

The best allocation of mechanical work between optional compressor 16 and vacuum pumps 42 and 42' depends upon the particular application. The negative pressure level, also referred to as the vacuum level, and purge stream flow into permeate chamber 18' will likely differ from that in purge chamber 18 due to the differing partial pressures of oxygen in feed chambers 12' and 12, respectively. The specific levels of purge flow and vacuum will, as aforesaid, depend largely upon the application and upon the oxygen permeation characteristics of the mixed conduction membrane material.

In general, it is best to use the lowest oxygen concentration purge gas that is economically available to purge both stages. If the total purge quantity is limited, it is preferable to use the purge gas with the highest oxygen concentration in the first stage and to use purge streams with progressively lower oxygen concentrations in successive stages.

A cleaning ratio is used to determine the purge flow rate, and is defined as follows:

$$\text{Cleaning Ratio} = \frac{(\text{Purge Flow})}{(\text{Feed Flow})} * \frac{(\text{Average Feed Pr.})}{(\text{Average Purge Pr.})}$$

This ratio should be within the range of from about 0.8 to about 5.0, preferably within the range of from about 1 to about 2.5. Cleaning ratios in excess of this range are undesirable because of economic factors and availability of the purge stream in such amounts. Cleaning ratios in amounts below this range are also undesirable because membrane area requirements increase and the ability to achieve the desired purity levels may diminish.

Calculations have been performed to derive the power required for the pressure-driven processes shown in FIGS. 3 and 4. Certain conditions and process configurations for removing oxygen have been assumed. For the calculations that follow, a feed stream of 10,000 NCFH of a gas (e.g. $N_2$) containing 5% oxygen at 175 psig has been assumed. The purge stream has been considered to contain 10% oxygen. The purge flow in each stage has been assumed to be that which yields a cleaning ratio of 1.5 in each stage. The oxygen concentration in the $N_2$ product stream has been assumed to be 0.05%. Vacuum pumps 42 and 42' have been assumed to be two-stage pumps with an isentropic efficiency of 60% per stage.

For the single stage process shown in FIG. 3, the $N_2$ purification can be achieved with a purge flow rate of 75 NCFH and a pressure $P_2$ in permeate chamber 18 of 0.95 psia. The resultant additional power for operating vacuum pump 42 is 2.73 kW. By contrast, the two stage process shown in FIG. 4 requires only 0.71 kW at point 78, FIG. 5. In arriving at this power value, the same purge gas containing 10% oxygen is used for both stages with atmospheric pressure in permeate chamber 18 and a pressure of 0.95 psia in permeate chamber 18'. For computation, the mid-stage oxygen mole fraction $X_m$ was taken to be the theoretical minimum value given by $$X_m = 0.1 \ (P_2/P_1)$$

Figure 5:
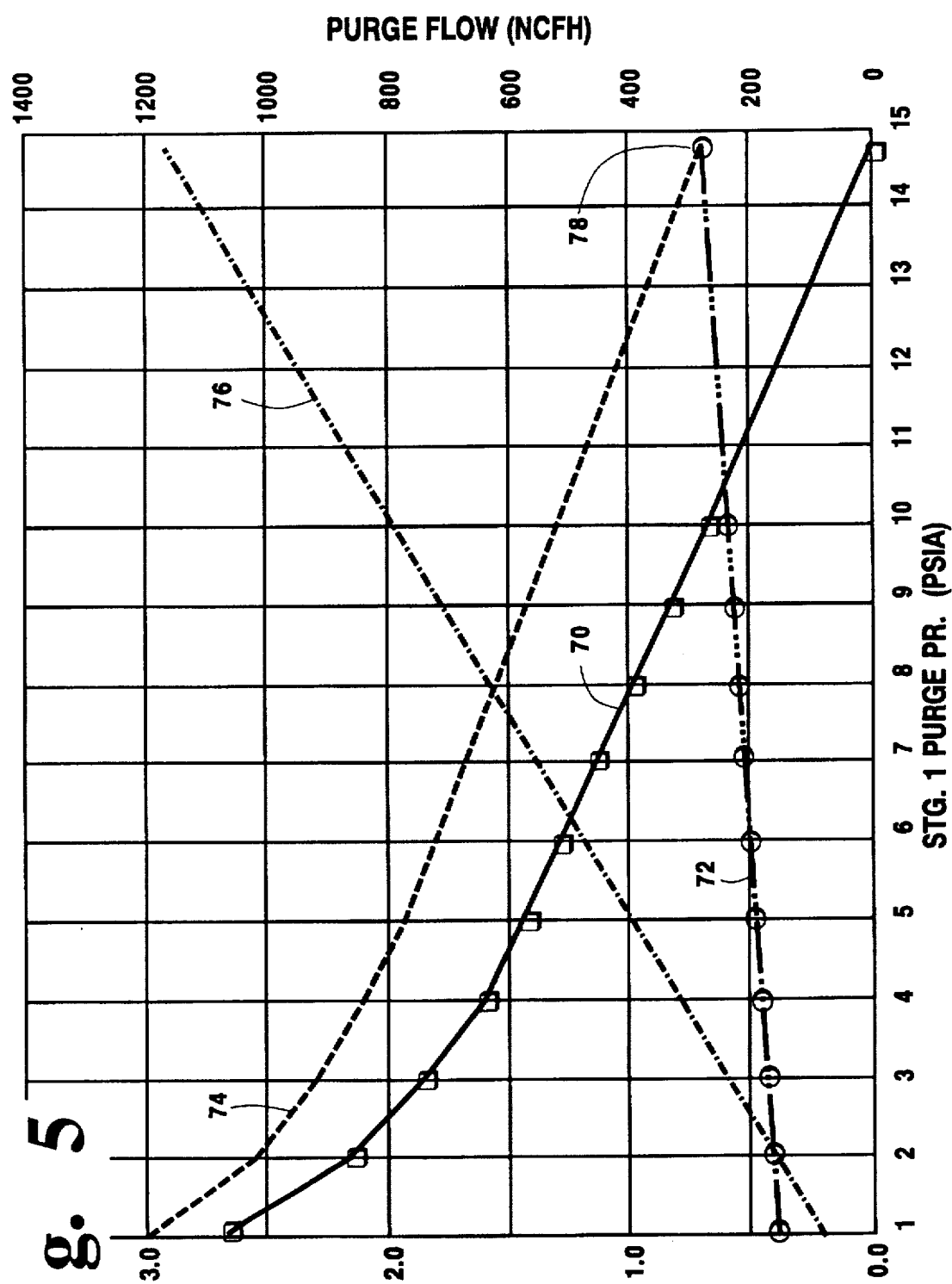
FIG. 5 is a plot of power and purge flow versus purge pressure, showing the effect of purge vacuum level on performance of the system of FIG. 4.

The flows and vacuum pump powers of system 41, FIG. 4, have been computed using the first stage purge pressure, provided as the X-axis of FIG. 5, and first stage purge flow rate, curve 76, as variables while maintaining a constant second stage product oxygen concentration of 0.05%. Curve 70, FIG. 5, indicates that the vacuum power for the first stage becomes smaller as the first stage purge pressure $P_2$ increases toward atmospheric. The second stage vacuum power, curve 72, is a weaker function of $P_2$ and varies in the opposite direction because as first stage purge pressure $P_2$ increases, less oxygen is removed in the first stage and more must be removed in the second stage. It is a realization of this invention that increasing the first stage purge flow significantly reduces the amount of first stage vacuum pumping required to achieve the desired final product oxygen concentration. The total vacuum power, curve 74, is found to be at a minimum, point 78, when the first stage is not vacuum pumped. As above indicated, the total power at point 78 is computed to be 0.7 kW, which is considerably lower than the 2.73 kW power computed for the single stage process of FIG. 3. Thus, when an adequate quantity of purge gas is available, there is considerable advantage to a pressure driven process comprising at least two stages.

Pressure driven processes are attractive for situations where large quantities of oxygen are to be permeated through a mixed conduction oxide membrane. In principle, the pressure driven process can also be used for removal of trace oxygen from the feed stream. This requires the oxygen partial pressure on the permeate side to be reduced to a level below that in the product stream. In practice, this can be accomplished by compressing the feed stream to a very high pressure, applying a very low vacuum level to the permeate and/or using a purge gas stream with a sufficiently low oxygen concentration.

The use of very high feed pressures or very low permeate pressures are power and capital intensive. Hence, non-purged pressure-driven processes tend to be economically unattractive for the removal of oxygen to achieve a very low concentration in the product. By contrast, large currents required by conventional electrically driven processes are too energy intensive to be applicable to the removal of large oxygen quantities. However, combined electrically-driven and mixed conductor membrane removal procedures according to the present invention are extremely effective at removing small to moderate quantities of oxygen from a gas stream to produce an extremely pure oxygen-free product stream. The latter requires expenditure of little power per unit of product. Applicants have thus determined that there are significant advantages to using combined pressure-driven and electrically-driven oxygen removal stages to produce an oxygen-free product from a feed stream containing moderate concentrations of oxygen typically less than 21% oxygen, preferably below 10% oxygen, and more preferably below 5% oxygen.

A combined pressure-driven and electrically-driven, two stage oxygen separation system 51, FIG. 6, is shown comprising separators 50 and 52. Separator 50 is substantially identical to that shown in FIG. 3 but does not include a vacuum pump coupled to permeate chamber 54. Electrically driven separator 52 is substantially identical to the structure shown in FIG. 2. However, electrically driven separator 52 receives its feed stream from the outlet of pressure-driven stage 50 wherein a substantial percentage of oxygen already has been removed from feed stream 56. A substantially similar separator structure is shown in FIG. 7 except that pressure-driven first separator stage 60 includes a vacuum pump 62 connected to permeate chamber 64. Electrically-driven stage 66 is structurally identical to separation stage 52 shown in FIG. 6. A related application disclosing two or more stages of solid electrolyte membranes, with successive stages being driven at increasing voltages and decreasing currents, entitled "Staged Electrolyte Membrane", U.S. Ser. No. 08/408,857, was filed on Mar. 22, 1995, now U.S. Pat.

No. 5,547,494 by the same inventors as for the present invention and is incorporated herein by reference.

Power has been calculated for the process configurations shown in FIG. 6 and FIG. 7. For the calculations, a feed stream of 10,000 NCFH of gas (e.g. $N_2$) containing 2% oxygen at 175 psig has been assumed. The purge stream has been considered to contain 10% oxygen. The cleaning ratio is 1.5. The product oxygen concentration has been assumed to be 1 ppm. Vacuum pump 62 (FIG. 7) has been assumed to be a one or two stage pump with an efficiency of 60% per stage. For the electrically driven separation stages, the applied voltage has been assumed to be 150% of the value determined by the Nernst equation, corresponding to an over-voltage of 50%. Electrically driven separation stages 52 and 66 have been assumed to operate at 800° C. The low pressure streams are assumed to exhaust to atmospheric pressure.

For comparison purposes, power has been computed for a single electrical separation stage such as that shown in FIG. 2 for the conditions specified immediately above. The Nernst voltage is computed to be 0.26 volts and the current for the specified flux of oxygen is 25,160 amperes. The power, including that for an over-voltage of 50% is 9.81 kW.

By contrast, the combined pressure-driven and electrically-driven, two-stage system in FIG. 6 exhibits a total electrical power requirement of 3.8 kW. The feed gas was $N_2$ containing 2% $O_2$ at 175 psig. The feed stream is compressed, if necessary, and transferred at elevated temperature to pressure-driven separation stage 50. Permeate chamber 54 has applied thereto a stream of 2,000 NCFH of gas containing 10% $O_2$ at slightly above atmospheric pressure.

Pressure-driven separation stage 50 is capable of removing 55% of the oxygen from the feed stream to create a mid-stage stream with an oxygen concentration of 0.8%. The remainder of the oxygen is removed in electrically-driven second separation stage 52 which operates at 800° C. As above indicated, the required electrical power is 3.8 kW. No electrical power is needed for the first stage since the purge stream is at atmospheric pressure. The work expended in the first stage is the portion of feed compression work needed to drive a quantity of oxygen through the membrane in that stage. Since the selectivity of the mixed-conduction membrane is effectively infinite, there is no loss of the inert gas or of its partial pressure in the first stage process.

Figure 8:
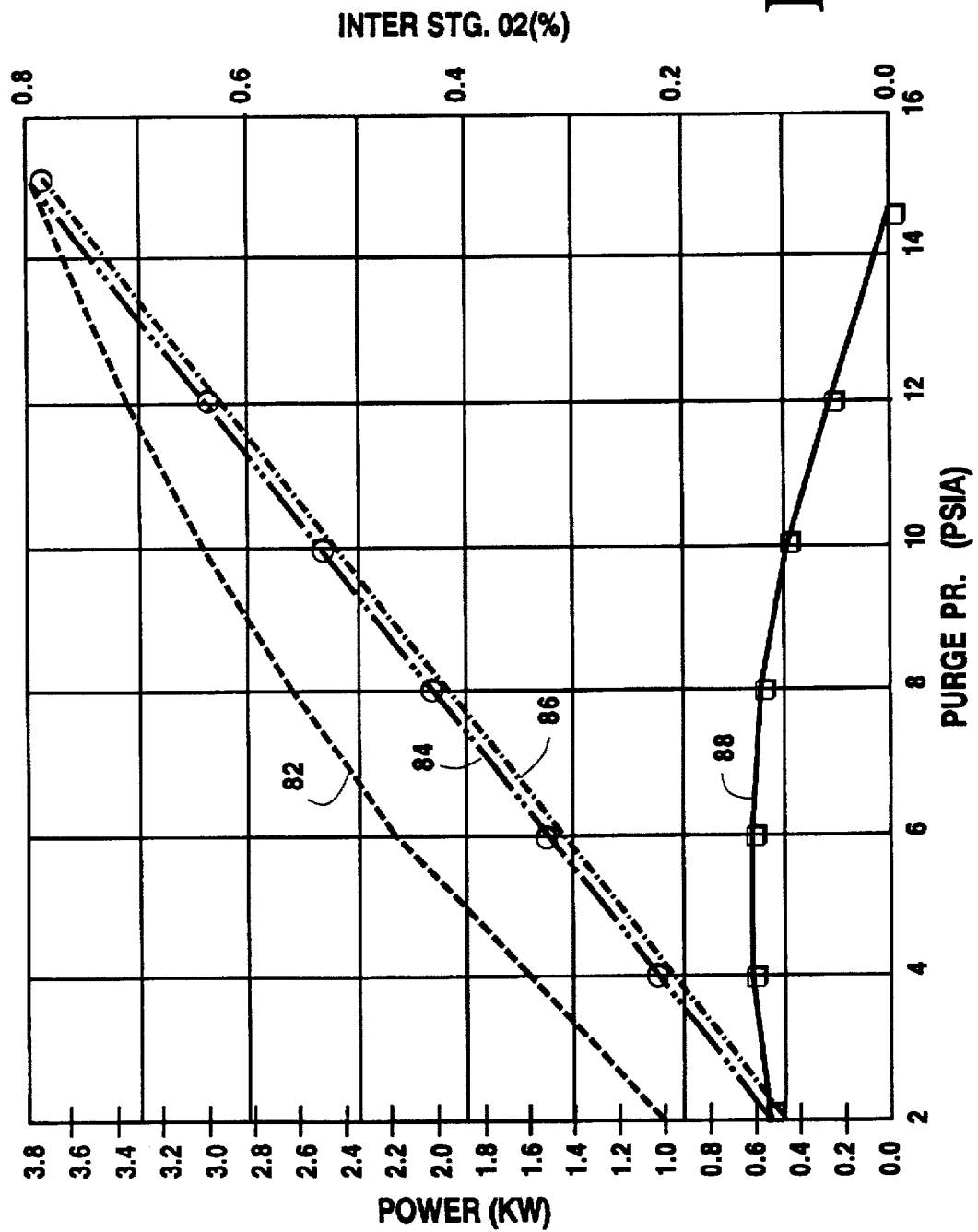
FIG. 8 is a plot of power versus purge pressure and interstage oxygen showing the effect of stage one purge vacuum level in the system of FIG. 7.

The power computations have been repeated for the system shown in FIG. 7. Vacuum pump 62 reduces the pressure in permeate chamber 64 in first separation stage 60. Vacuum pump power is plotted as curve 88, FIG. 8, as needed to achieve the values of first stage purge pressure $P_2$ in permeate chamber 64 that are provided on the X-axis. Total power, curve 82, is the sum of first stage vacuum pump power, curve 88, and second stage electrical power, curve 84. Inter-stage oxygen mole fraction $X_m$ is plotted as curve 86. The minimum total power is seen to occur when the purge pressure is lowest (2 psia). The electrical power and vacuum pump power are effectively equal and the total power consumed is 1.03 kW.

A multiple stage system according to the present invention is preferred to enable use of different types of SELIC membranes, different grades of purge gas, or different combinations of negative pressure and purge. The term "SELIC" refers to solid electrolyte ionic or mixed conductors that can transport oxide ions. In multiple stage systems according to this invention, ionic membranes can be placed in different arrangements with mixed conductor membranes, preferably having an ionic membrane downstream of a mixed conductor membrane. This arrangement optimizes the ability of the preceding mixed conductor membrane to remove large amounts of oxygen from an oxygen-rich feed stream by a pressure-driven process, and the ability of the successive ionic membrane to extract oxygen from a low-oxygen feed stream by an electrically-driven process. Mixed conductors are not as suitable for extracting oxygen down to very low oxygen partial pressures, and ionic conductors consume tremendous amounts of power when subjected to high-oxygen feed streams.

Different types of SELIC membranes utilized for multiple stage system according to this invention include membranes formed of different ionic or mixed conductor materials. In one construction, for example, a first stage membrane includes a mixed conductor perovskite which exhibits high oxygen ion conductivity but is unstable at very low oxygen partial pressures. A successive stage membrane includes yttria-stabilized zirconia "YSZ" ($ZrO_2$ with 8% by weight of $Y_2O_3$), which exhibits a much lower oxygen ion conductivity but is stable at low oxygen partial pressures.

One or more SELIC materials can be combined together in a single membrane, such as one of the multiphase mixtures disclosed in U.S. Pat. No. 5,306,411 (Mazanec et al.), to tailor that membrane for the requirements of a particular stage. Further, different mechanical configuration can be used, such as a cross-flow geometry in the first stage, or in an electrically-driven second stage, in which permeate is withdrawn at right-angles to feed and retentate flows.

Different grades of purge gas, if readily available, are used economically in different stages according to the present invention. Preferably, a less expensive low-grade (higher oxygen concentration) gas is applied to the first stage while more-expensive, higher-grade (low oxygen concentration) gas is used only in the last stage. The oxygen concentration of a successive stage purge is preferably at least ten percent lower, and more preferably at least fifty percent lower, than that of the preceding stage purge. In one construction, air serves as the purge gas in the first stage together with a negative pressure applied to the permeate by a vacuum pump, or with a higher feed pressure.

In another embodiment, different vacuum levels are applied per stage, with decreasing negative pressure in successive stages. Decreasing negative pressures reduce the amount and quality of purge gas required to practice the present invention. The negative pressure applied to a successive stage is preferably at least ten percent lower, and most preferably at least fifty percent lower, than that of the preceding stage.

Typically, the permeate must be cooled to below 100° C., preferably below 50° C., before it reaches a vacuum pump. It is desirable to recover the heat using a heat exchanger to warm the feed stream prior to contacting the first SELIC membrane.

The type and amount of purge used in a process according to the present invention depends on optimizing performance based on oxygen partial pressures and total pressures on both sides of the SELIC membranes. Preferred flow rates range from zero (if sufficient negative pressure is applied to a closed-end permeate zone) to the same order of magnitude as the feed flow, more preferably from 5% to 30% of the feed flow. Feed stream pressures typically range from one atmosphere to several hundred psia. Negative pressures at the permeate side range from 0.5 psia to 12 psia, preferably 3–7 psia.

In yet another embodiment, a single-stage permeation process utilizes different amounts of product as a purge stream for a mixed-conducting, solid-oxide-electrolyte membrane, such as that shown in FIG. 3. For these calculations, the vacuum pump has been eliminated and a portion of the product has been taken as the purge stream for refluxing the low-pressure side of the membrane. A production rate of 100,000 NCFH of nitrogen product has been assumed. The product pressure has been taken as 100 psig and the waste is assumed to discharge to the atmosphere at 15 psia. The operating temperature of the membrane is 800° C. (1470° F.) where the ionic resistivity is 0.9 Ω-cm. The membrane thickness has been assumed to be 1 mm.

The specific membrane area and the compressed feed air flow have been computed for various values of the purge ratio (the fraction of the retentate taken for purging). Two values of product purity have been used. In the first case the product oxygen concentration has been taken as 0.001 (0.1%) and in the second case a value of 0.000001 (1 ppm.) has been used. The results of these computations are displayed in Table 1.

TABLE 1

| $O_2$ conc. in Prod. $N_2$ | Purge Ratio | Specific Membrane Area (ft$^2$/1000 NCFH) | Compressed Feed Air (NCFH) | $N_2$ Recovery (%) |
|---|---|---|---|---|
| 0.001 | 0.15 | 300 | 149,000 | 0.85 |
|  | 0.175 | 250 | 153,000 | 0.825 |
| (0.1%) | 0.20 | 226 | 158,000 | 0.80 |
| 0.000001 | 0.15 | 345 | 149,000 | 0.85 |
|  | 0.175 | 272 | 153,000 | 0.825 |
| (1 ppm) | 0.20 | 238 | 158,000 | 0.80 |
|  | 0.25 | 204 | 169,000 | 0.69 |

The minimum purge ratio is equal to the low pressure divided by the high pressure or $P_2/P_1$, which is 15/114.7= 0.131 in this case. With lower purge ratios, the required purity cannot be obtained. Table 1 shows that the desired product purity can be achieved with any of the purge ratios listed. The smaller purge ratios require compressing less feed, but also require more membrane area. There is thus a trade off between the capital cost of the membrane area, and the operating cost of compressing more gas. The optimum purge ratio thus depends on economic factors and may differ from case to case. For the conditions underlying Table 1, a product purge ratio of 0.15 is probably satisfactory for the lower purity product, while a ratio of 0.20 may be more appropriate for the higher purity product. In general, product purge ratios range from 0.05 to 0.50, preferably from 0.10 to 0.20.

Figure 9:
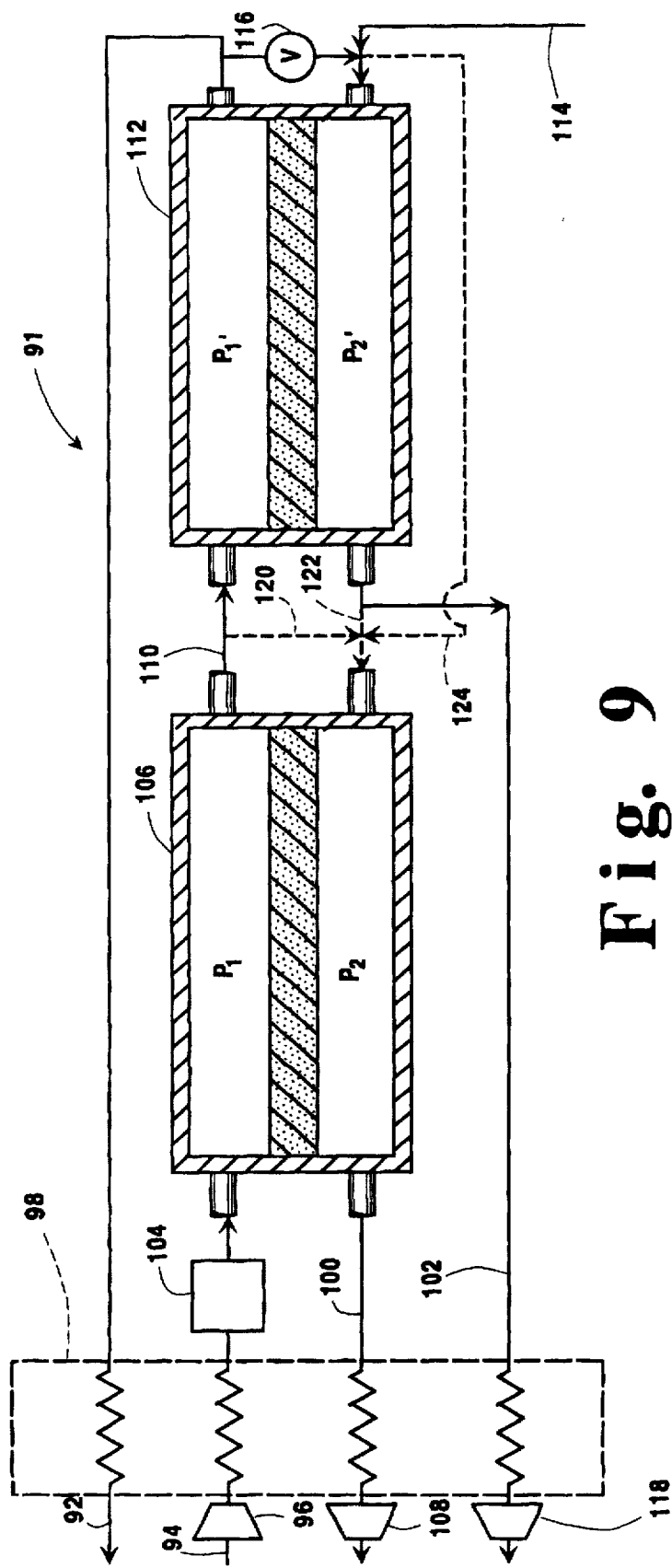
FIG. 9 is a schematic diagram of an alternative dual stage oxygen separation process utilizing a portion of retentate to enhance oxygen removal.

System 91, FIG. 9, is suitable for bulk production of a low-oxygen-concentration retentate product 92, such as nitrogen product, from a feed stream 94 such as air. Different purge configurations including permeate and/or product purge are utilized as described below.

Feed stream 94 is compressed by compressor 96 and enters a heat exchanger 98 where the temperature of feed stream 94 is elevated by heat exchange with product stream 92, oxygen byproduct stream 100 and waste stream 102. A trim heater 104 further elevates the feed stream temperature as desired. The heated feed stream is applied to first separator 106, and a first portion of entrained oxygen is driven from the feed zone to the permeate zone via a first SELIC membrane, preferably a mixed conducting membrane. The oxygen partial pressure $P_2$ in the permeate zone optionally is lowered by vacuum pump 108 in the construction illustrated with solid lines. Pure oxygen is thereby obtained as byproduct stream 100.

Feed stream output 110 is directed to a second feed zone of a second separator 112, and a second portion of oxygen, which is entrained in the feed stream output 110 from the first feed zone, is driven into a second permeate zone through a second SELIC membrane. Oxygen-depleted nitrogen is obtained as product stream 92.

The second permeate zone is purged with an external stream 114 having a low oxygen concentration, such as a nitrogen- or argon-rich stream from an air separation plant, if available. Alternatively, or in combination with stream 114, a fraction or portion of product stream 92 is divertable through valve 116 to purge the second permeate zone. In general, the ratio of purge flow to product flow ranges from 0.05 to 5.

Less product purge is needed when vacuum pump 118 is activated. Pure oxygen is obtainable as stream 102 if no purge is utilized.

At least three other countercurrent arrangements for purging the first permeate zone are illustrated in phantom. A fraction of first feed stream output 110 is divertable to the first permeate zone through conduit 120. In another arrangement, some or all of second permeate output 102 is delivered through conduit 122 to purge the first permeate zone. In yet another embodiment, a portion of product 92 and/or external stream 114 are delivered through conduit 124. One or more combinations of these different purge stream arrangements are achievable through appropriate valve and conduit configurations, and are desirable when byproduct stream 100 is not required to be pure oxygen.

The above examples show that efficient processes and apparatus can be designed to remove oxygen from a gas stream using solid oxide electrolytes as membranes. By employing electrolytes that also have significant electronic conductivity (i.e. mixed conductors), the separation process can be pressure driven, without a need for electrodes and applied electrical voltages. The use of vacuum pumping, purging, or both on the permeate side greatly increases the capability and efficiency of the pressure-driven process. Vacuum pumping, purging, or both also reduce the power consumed by an electrically-driven process. Significant improvements in power consumption are achieved by conducting the purification process in two or more stages with the successive stages operating at lower permeate pressures. Progressively lower permeate pressures can be created by vacuum pumping to progressively lower pressures and/or by purging with gas streams containing progressively lower oxygen concentrations as described above. By combining a pressure-driven permeation stage with an electrically-driven permeation stage, using ionically-conducting, solid-oxide membranes, the pressure-driven stage removes the bulk of the oxygen whereas the electrically-driven stage removes the last traces of oxygen to produce a high purity oxygen-free product.

The material compositions for the mixed conduction oxide membrane may be prepared from a variety of materials including those listed in Table 2 below. In Table 2, $\delta$ is the deviation from oxygen stoichiometry. In addition, the x and y values may vary depending on the material composition.

TABLE 2

Mixed Conducting Solid Electrolytes

Material composition

1. $(La_{1-x}Sr_x)(Co_{1-y}Fe_y)O_{3-\delta}$
   $(0 \leq x \leq 1, 0 \leq y \leq 1, \delta$ from stoichiometry$)$
2. (a) $SrMnO_{3-\delta}$

TABLE 2-continued

Mixed Conducting Solid Electrolytes

Material composition (b) $SrMn_{1-x}Co_xO_{3-\delta}$ ($0 \leq x \leq 1$, $0 \leq y \leq 1$, $\delta$ from stoichiometry)
(c) $Sr_{1-x}Na_xMnO_{3-\delta}$ 3. (a) $BaFe_{0.5}Co_{0.5}YO_3$
   (b) $SrCeO_3$
   (c) $YBa_2Cu_3O_{7-b}$ ($0 \leq \beta \leq 1$, $\beta$ from stoichiometry)

4. (a) $La_{0.2}Ba_{0.8}Co_{0.8}Fe_{0.2}O_{2.6}$
   (b) $Pr_{0.2}Ba_{0.8}Co_{0.8}Fe_{0.2}O_{2.6}$

5. $A_xA'_{x'}A''_{x''}B_yB'_{y'}B''_{y''}O_{3-z}$
   ($x, x', x'', y, y', y''$ all in 0–1 range)
   where: A, A', A" = from groups 1, 2, 3 and f-block lanthanides
   B, B', B" = from d-block transition metals 6. (a) Co-La-Bi type:
   | | |
   |---|---|
   | Cobalt oxide | 15–75 mole % |
   | Lanthanum oxide | 13–45 mole % |
   | Bismuth oxide | 17–50 mole % |

(b) Co-Sr-Ce type:
   | | |
   |---|---|
   | Cobalt oxide | 15–40 mole % |
   | Strontium oxide | 40–55 mole % |
   | Cerium oxide | 15–40 mole % |

(c) Co-Sr-Bi type:
   | | |
   |---|---|
   | Cobalt oxide | 10–40 mole % |
   | Strontium oxide | 5–50 mole % |
   | Bismuth oxide | 35–70 mole % |

(d) Co-La-Ce type:
   | | |
   |---|---|
   | Cobalt oxide | 10–40 mole % |
   | Lanthanum oxide | 10–40 mole % |
   | Cerium oxide | 30–70 mole % |

(e) Co-La-Sr-Bi type:
   | | |
   |---|---|
   | Cobalt oxide | 15–70 mole % |
   | Lanthanum oxide | 1–40 mole % |
   | Strontium oxide | 1–40 mole % |
   | Bismuth oxide | 25–50 mole % |

(f) Co-La-Sr-Ce type:
   | | |
   |---|---|
   | Cobalt oxide | 10–40 mole % |
   | Lanthanum oxide | 1–35 mole % |
   | Strontium oxide | 1–35 mole % |
   | Cerium oxide | 30–70 mole % |

7. $Bi_{2-x-y}M'_xM_yO_{3-\delta}$ ($0 \leq x \leq 1$, $0 \leq y \leq 1$, $\delta$ from stoichiometry)
   where: M' = Er, Y, Tm, Yb, Tb, Lu, Nd, Sm, Dy, Sr, Hf, Th, Ta, Nb, Pb, Sn, In, Ca, Sr, La and mixtures thereof
   M = Mn Fe, Co, Ni, Cu and mixtures thereof 8. $BaCe_{1-x}Gd_xO_{3-x/2}$ 9. Dual phase mixed conductors (electronic/ionic):

$(Pd)_{0.5}/(YSZ)_{0.5}$
   $(Pt)_{0.5}/(YSZ)_{0.5}$
   $(B-MgLaCrO_x)_{0.5}(YSZ)_{0.5}$
   $(In_{90\%}Pt_{10\%})_{0.6}/(YSZ)_{0.5}$
   $(In_{90\%}Pt_{10\%})_{0.5}/(YSZ)_{0.5}$
   $(In_{95\%}Pr_{2.5\%}Zr_{2.5\%})_{0.5}/(YSZ)_{0.5}$

Mixed electronic/ionic conductors of item 9 in Table 2 are dual phase mixed conductors that are comprised of physical mixtures of an ionically-conducting phase and an electronically-conducting phase.

Electrically driven SELIC membranes based on ionic conductors may be selected from the following materials in Table 3:

TABLE 3

Ionic Conductor SELIC Materials

10. $(Bi_2O_3)_x (M_{y1}O_{y2})_{1-x}$
    wherein M may be selected from Sr, Ba, Y, Gd, Nb, Ta, Mo, W, Cd, Er and combinations thereof, and
    x is greater than or equal to 0 and less than or equal to 1.

11. $CaTi_{0.7}Al_{0.3}O_{3-x}$
    wherein x is greater than or equal to 0 and less than or equal to 1.

12. $CaTi_{0.5}Al_{0.5}O_{3-\delta}$
    wherein $\delta$ is determined by stoichiometry.

TABLE 3-continued

Ionic Conductor SELIC Materials

13. $CaTi_{0.95}Mg_{0.05}O_{3-\delta}$
    wherein $\delta$ is determined by stoichiometry.

14. $ZrO_2\text{-}Tb_4O_7$

15. $ZrO_2\text{-}Y_2O_3\text{-}Bi_2O_3$

16. $BaCeO_3$:Gd

17. $BaCeO_3$; $BaCeO_3$:Y; $BaCeO_3$:Nd

18. $La_xSr_{1-x}Ga_yMg_{1-y}O_{3-\delta}$
    wherein x is greater than or equal to 0 and less than or equal to 1,
    y is greater than or equal to 0 and less than or equal to 1, and
    $\delta$ is determined by stoichiometry.

Specific features of the invention are shown in one or more of the drawings for convenience only, as each feature may be combined with other features in accordance with the invention. Alternative embodiments will be recognized by those skilled in the art and are intended to be included within the scope of the claims.

What is claimed is:

1. A process for removing oxygen from a feed stream to obtain an oxygen-depleted product stream and an oxygen byproduct stream, comprising:

applying said feed stream to a first separator including a first feed zone and a first permeate zone separated by a first solid electrolyte mixed conduction membrane;

driving a first portion of entrained oxygen in said feed stream from said first feed zone to said first permeate zone via said first membrane without applying a purge stream to said first permeate zone;

obtaining an oxygen byproduct stream from said first permeate zone;

directing a feed stream output from said first feed zone of said first separator to a second feed zone of at least a second separator, said second separator provided with a second permeate zone separated from said second feed zone by a second solid electrolyte ionic or mixed conduction membrane;

driving a second portion of oxygen, which is entrained in said feed stream output from said first feed zone, from said second feed zone to said second permeate zone via said second membrane;

obtaining an oxygen-depleted product stream after entrained oxygen has been removed from said second feed zone; and wherein said driving for said second separator is accomplished by establishing a Tower partial pressure of oxygen in the permeate zone for said second membrane by applying at least a purge stream to that permeate zone and includes diverting a portion of output from at least one of said first and second feed zones to purge the permeate zone of said second separator.

2. The process of claim 1 wherein said second membrane is an ionic membrane, and the step of driving for said second separator includes providing an electrical current to and a voltage across said second membrane.

3. The process of claim 1 wherein the step of driving for said first separator utilizes a negative pressure applied to said first permeate zone.

4. The process of claim 1 wherein said second membrane in said second separator includes a mixed conductor material.

5. The process of claim 4 wherein a first negative pressure is applied to said first permeate zone and a second different negative pressure is applied to said second permeate zone.

6. The process of claim 5 wherein said second negative pressure is lower than said first negative pressure.

7. The process of claim 5 wherein said second negative pressure is at least ten percent lower than said first negative pressure.

8. The process of claim 1 wherein said first membrane is formed of a different material than said second membrane.

9. The process of claim 1 wherein said first membrane is formed of a mixed conductor which exhibits high oxygen ion conductivity and said second membrane is stable at low oxygen partial pressures.

* * * * *

UNITED STATES PATENT AND TRADEMARK OFFICE
CERTIFICATE OF CORRECTION

PATENT NO. : 5,733,435
DATED : March 31, 1998
INVENTOR(S) : Prasad et al.

It is certified that error appears in the above-identified patent and that said Letters Patent is hereby corrected as shown below:

claim 1, last clause, second line, please replace "Tower" with "lower"

Signed and Sealed this

Second Day of June, 1998

*Attest:*

BRUCE LEHMAN

*Attesting Officer*  *Commissioner of Patents and Trademarks*